(12) United States Patent
Park

(10) Patent No.: US 11,451,679 B2
(45) Date of Patent: Sep. 20, 2022

(54) IMAGE OUTPUT MANAGEMENT APPARATUS, IMAGE OUTPUT APPARATUS, AND NON-TRANSITORY COMPUTER READABLE MEDIUM

(71) Applicant: FUJIFILM Business Innovation Corp., Tokyo (JP)

(72) Inventor: Youngkeun Park, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 220 days.

(21) Appl. No.: 16/458,197

(22) Filed: Jul. 1, 2019

(65) Prior Publication Data
US 2020/0021700 A1 Jan. 16, 2020

(30) Foreign Application Priority Data
Jul. 12, 2018 (JP) .............................. JP2018-131963

(51) Int. Cl.
*H04N 1/00* (2006.01)
*H04N 1/327* (2006.01)

(52) U.S. Cl.
CPC ..... *H04N 1/00477* (2013.01); *H04N 1/00244* (2013.01); *H04N 1/32771* (2013.01); *H04N 2201/0094* (2013.01)

(58) Field of Classification Search
USPC ....... 358/1.1–3.29, 1.11–1.18; 382/155–160; 704/200–277
See application file for complete search history.

(56) References Cited

U.S. PATENT DOCUMENTS

| 8,582,162 B2 | 11/2013 | Numata |
| 2012/0109915 A1* | 5/2012 | Kamekawa ............. G06F 16/93 707/695 |
| 2012/0173670 A1* | 7/2012 | Shinada ................ H04L 63/104 709/217 |
| 2012/0327463 A1* | 12/2012 | Mizuno ................. G06F 3/1288 358/1.15 |
| 2013/0077112 A1* | 3/2013 | Dodd .................. G06K 15/4025 358/1.16 |

(Continued)

FOREIGN PATENT DOCUMENTS

| EP | 1462982 | * | 2/2011 | ............... G06K 7/00 |
| JP | H06103005 | | 4/1994 | |

(Continued)

OTHER PUBLICATIONS

"Office Action of Japan Counterpart Application" with English translation thereof, dated Jun. 7, 2022, p. 1-p. 8.

*Primary Examiner* — Marcellus J Augustin
(74) *Attorney, Agent, or Firm* — JCIPRNET

(57) ABSTRACT

An image output management apparatus includes a determination unit and a generating unit. The determination unit compares, with one another, pieces of request information for requesting image output, and thus determines pieces of request information satisfying a predetermined similarity condition. The generating unit generates presentation information as prior information. The presentation information indicates the pieces of request information satisfying the similarity condition. The prior information is presented to a user before execution of image output according to the pieces of request information.

13 Claims, 10 Drawing Sheets

(56) References Cited

U.S. PATENT DOCUMENTS

2017/0053003 A1* 2/2017 Endoh ............... G06F 16/24578

FOREIGN PATENT DOCUMENTS

| | | | | |
|---|---|---|---|---|
| JP | 2000015875 | | 1/2000 | |
| JP | 2002149670 | * | 5/2002 | ............. G06F 17/30 |
| JP | 2011059860 | | 3/2011 | |
| JP | 2012038099 | | 2/2012 | |
| JP | 2013101643 | * | 5/2013 | ............... G06T 1/00 |
| JP | 2014211884 | * | 11/2014 | ............. G06F 17/30 |
| JP | 2015028704 | | 2/2015 | |
| JP | 2015139973 | | 8/2015 | |

* cited by examiner

FIG. 3

| FILE NAME |
|---|
| CREATION DATE AND TIME |
| USER NAME |
| FILE REGISTRATION DATE AND TIME |
| FILE VERSION |
| USER GROUP NAME |
| OUTPUT SHEET COUNT |
| FILE SIZE |
| FILE FORMAT |
| OUTPUT PATTERN |
| OUTPUT COUNT |
| ⋮ |

FIG. 5

| REQUEST NO. | FILE NAME | VERSION | OUTPUT TIME | USER NAME | CREATION DATE | CREATION TIME | GROUP NAME | OUTPUT PATTERN | | |
|---|---|---|---|---|---|---|---|---|---|---|
| | | | | | | | | DUPLEX | LANDSCAPE | PORTRAIT |
| 1 | abcde | ver1.0 | (NOT YET) | AAA | 2018/01/01 | 10:00 AM | GENERAL AFFAIRS DEPARTMENT | ○ | ○ | |
| 2 | abcde | ver1.0 | (NOT YET) | AAA | 2018/01/01 | 10:05 AM | GENERAL AFFAIRS DEPARTMENT | ○ | ○ | |

FIG. 7

| REQUEST NO. | FILE NAME | VERSION | OUTPUT TIME | USER NAME | CREATION DATE | CREATION TIME | GROUP NAME | OUTPUT PATTERN | | |
|---|---|---|---|---|---|---|---|---|---|---|
| | | | | | | | | DUPLEX | LANDSCAPE | PORTRAIT |
| 1 | abcde | ver1.0 | (NOT YET) | AAA | 2018/01/01 | 10:00 AM | GENERAL AFFAIRS DEPARTMENT | ◯ | ◯ | |
| 2 | abcde | ver1.0 | (NOT YET) | AAA | 2018/01/01 | 10:05 AM | GENERAL AFFAIRS DEPARTMENT | ◯ | ◯ | |
| 3 | abcde | ver1.1 | (NOT YET) | AAA | 2018/01/01 | 10:10 AM | GENERAL AFFAIRS DEPARTMENT | ◯ | ◯ | |

FIG. 9

| REQUEST NO. | FILE NAME | VERSION | OUTPUT TIME | USER NAME | CREATION DATE | CREATION TIME | GROUP NAME | OUTPUT PATTERN | | |
|---|---|---|---|---|---|---|---|---|---|---|
| | | | | | | | | DUPLEX | LANDSCAPE | PORTRAIT |
| 1 | abcde | ver1.0 | (NOT YET) | AAA | 2018/01/01 | 10:00 AM | GENERAL AFFAIRS DEPARTMENT | ◯ | ◯ | |
| 2 | abcde | ver1.0 | (NOT YET) | AAA | 2018/01/01 | 10:05 AM | GENERAL AFFAIRS DEPARTMENT | ◯ | ◯ | |
| 3 | abcde | ver1.1 | 10:20 AM | AAA | 2018/01/01 | 10:10 AM | GENERAL AFFAIRS DEPARTMENT | ◯ | ◯ | |
| 4 | abcde | ver1.0 | (NOT YET) | BBB | 2018/01/01 | 3:10 PM | GENERAL AFFAIRS DEPARTMENT | ◯ | | ◯ | ature # IMAGE OUTPUT MANAGEMENT APPARATUS, IMAGE OUTPUT APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-131963 filed Jul. 12, 2018.

BACKGROUND

(i) Technical Field

The present disclosure relates to an image output management apparatus, an image output apparatus, and a non-transitory computer readable medium.

(ii) Related Art

Japanese Unexamined Patent Application Publication No. 6-103005 describes a printer control apparatus. In the printer control apparatus, when an interrupt request for printing is received while document data, which is written in a page description language with which each page is managed independently, is being printed, a print process is interrupted at a point between pages, and print information obtained at the interruption between pages is stored. When the interrupt printing is completed, the stored print information at the interruption is referred to, and the interrupted printing of the document data is restarted.

Japanese Unexamined Patent Application Publication No. 2000-15875 describes a print control method. In the print control method, when intermediate-data pages are generated in a page description language (PDL) interpretation job, it is determined whether the color attribute of each page indicates black and white or color. If the result does not match the function of a printer, the page is transferred to another printer whose function matches the color attribute.

For example, as described in Japanese Unexamined Patent Application Publications No. 6-103005 and No. 2000-15875, an apparatus and a control method in which image output such as printing is performed are known. Image output is performed, for example, according to request information from a user for requesting image output.

For example, assume the case in which pieces of request information include pieces of request information that are given by the same user and that are for the same file and overlap one another, and in which image output is performed according to the pieces of request information that overlap one another. In this case, some of the image outputs, which overlap one another, may be wasteful.

SUMMARY

Aspects of non-limiting embodiments of the present disclosure relate to informing a user of pieces of request information, which may overlap one another, before execution of image output according to the pieces of request information.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image output management apparatus including a determination unit and a generating unit. The determination unit compares, with one another, pieces of request information for requesting image output, and thus determines pieces of request information satisfying a predetermined similarity condition. The generating unit generates presentation information as prior information. The presentation information indicates the pieces of request information satisfying the similarity condition. The prior information is presented to a user before execution of image output according to the pieces of request information.

BRIEF DESCRIPTION OF THE DRAWINGS

Exemplary embodiment of the present disclosure will be described in detail based on the following figures, wherein:

FIG. 3 is a diagram illustrating a concrete example of request information for requesting image output;

FIG. 5 is a diagram illustrating a first concrete example of pieces of request information satisfying a similarity condition;

FIG. 7 is a diagram illustrating a second concrete example of pieces of request information satisfying a similarity condition;

FIG. 9 is a diagram illustrating a third concrete example of pieces of request information satisfying a similarity condition.

DETAILED DESCRIPTION

Figure 1:
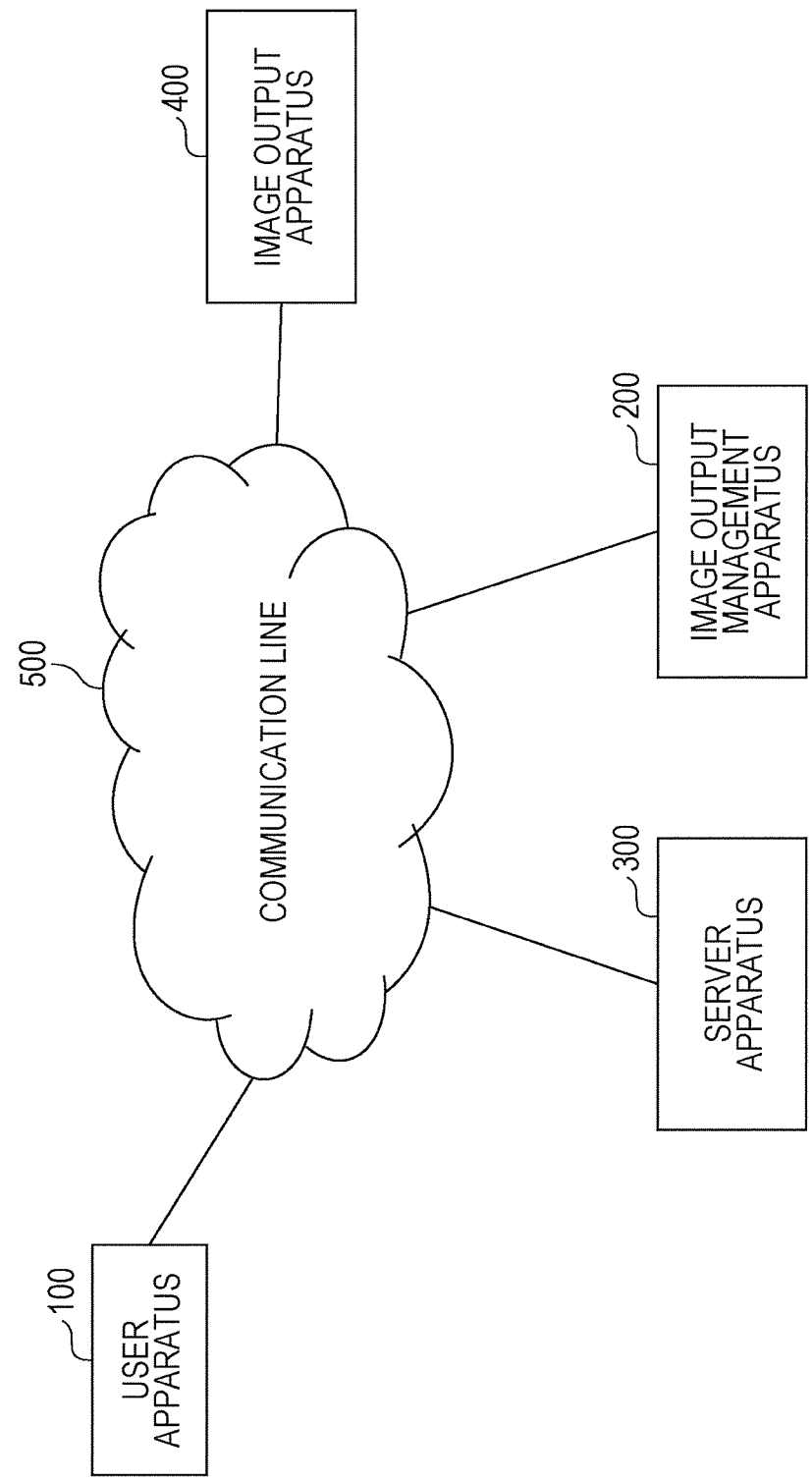
FIG. 1 is a diagram illustrating a concrete example of an image output system.

FIG. 1 is a diagram illustrating an exemplary specific embodiment of the present disclosure. FIG. 1 illustrates a concrete example of an image output system including a user apparatus 100, an image output management apparatus 200, a server apparatus 300, and an image output apparatus 400. In the concrete example illustrated in FIG. 1, for example, the user apparatus 100, the image output management apparatus 200, the server apparatus 300, and the image output apparatus 400 are connected to one another via a communication line 500, using either or both of wireless communication and wired communication, so as to receive/transmit data (information) from/to one another.

The user apparatus 100 is used by a user of the image output system illustrated in FIG. 1. Concrete examples of the user apparatus 100 include an information processing apparatus such as a personal computer and a portable terminal apparatus, such as a smartphone or a tablet terminal.

The image output management apparatus 200 manages image output according to request information from users who request image output. The image output management apparatus 200 generates presentation information for presenting pieces of request information, which may overlap one another, to a user before execution of image output according to the pieces of request information. For example, the generated presentation information is displayed on a display device or the like provided for the image output apparatus 400, and is presented to the user when the user uses the image output apparatus 400.

The server apparatus 300 manages files that are to be subjected to image output. The server apparatus 300 stores and manages, for example, files registered by users via the user apparatus 100. In addition, for example, content files managed by a content management apparatus (not illustrated) may be registered in the server apparatus 300. Concrete examples of files include files of image (which may be an image including only characters and/or symbols) data.

The image output apparatus 400 outputs images according to request information from users who request image output. One concrete example of the image output apparatus 400 is a multifunction apparatus provided with multiple image output functions (at least some of the functions, such as a print function, a scanner function, a copy function, and a facsimile function). For example, if the image output apparatus 400 is a multifunction apparatus, the image output apparatus 400 may be installed in a company, a school, or the like, and may be used by clients in the company or the school. Alternatively, the image output apparatus 400 may be installed in a shop such as a convenience store, and may be used by general public clients. The image output apparatus 400 may be an apparatus provided only with one of the multiple image output functions.

Figure 2:
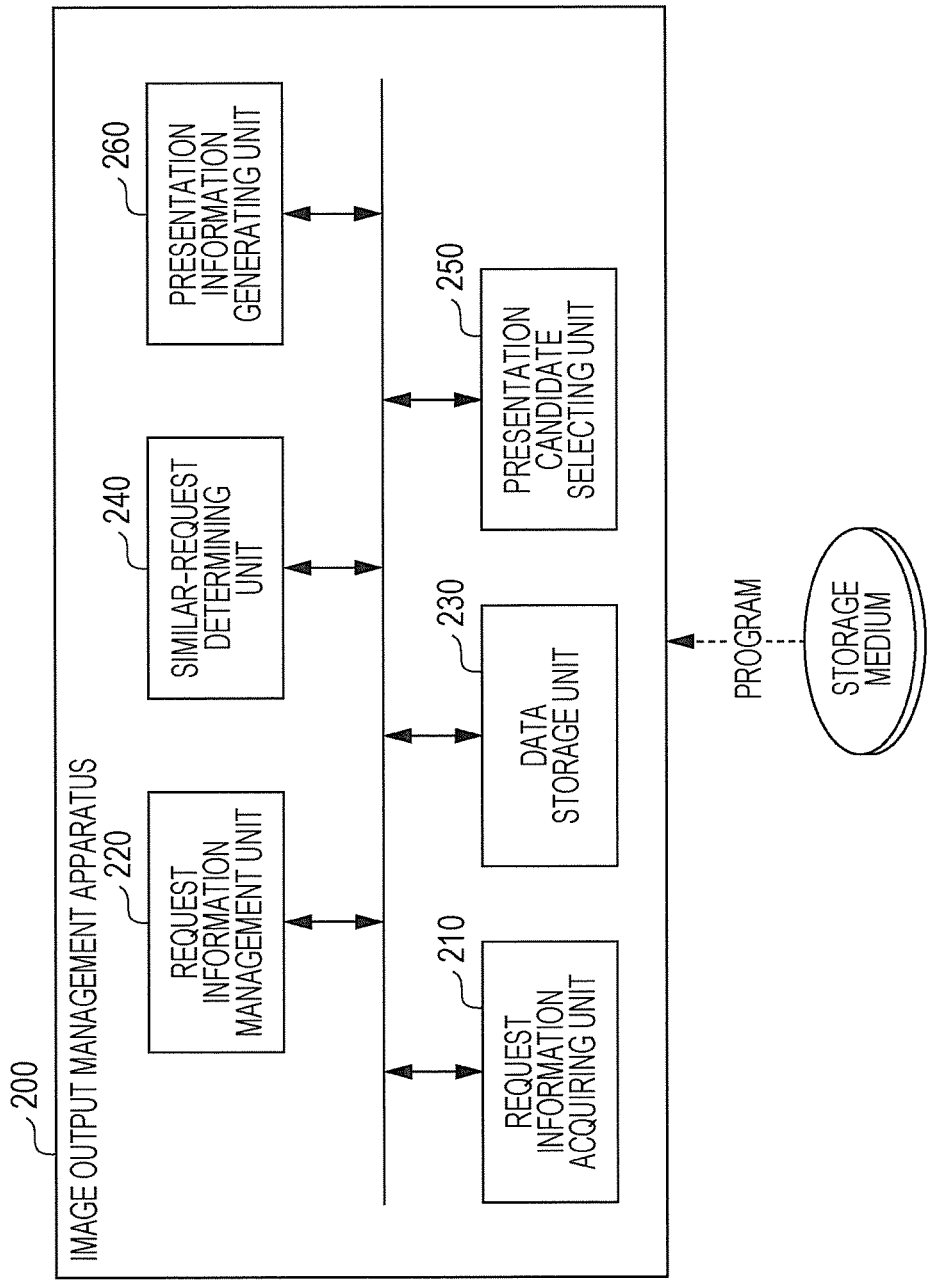
FIG. 2 is a diagram illustrating a concrete example of an image output management apparatus.

FIG. 2 is a diagram illustrating a concrete example of the image output management apparatus 200 (FIG. 1). In the concrete example illustrated in FIG. 2, the image output management apparatus 200 includes a request information acquiring unit 210, a request information management unit 220, a data storage unit 230, a similar-request determining unit 240, a presentation candidate selecting unit 250, and a presentation information generating unit 260.

The request information acquiring unit 210 acquires one or more pieces of request information for requesting image output. For example, request information from a user who requests image output is transmitted from the user's user apparatus 100, and the request information acquiring unit 210 acquires the transmitted request information through reception using a communication device. Alternatively, request information from a user may be transmitted from the user's user apparatus 100 to the server apparatus 300, and the request information may be transferred from the server apparatus 300 to the image output management apparatus 200. Thus, the request information acquiring unit 210 may acquire the transferred request information.

The request information management unit 220 manages one or more pieces of request information for requesting image output. For example, the request information management unit 220 manages pieces of request information obtained from multiple users. The request information is, for example, stored in the data storage unit 230 and is managed by the request information management unit 220.

The data storage unit 230 stores one or more pieces of request information managed by the request information management unit 220. In addition, the data storage unit 230 may store various types of data used by the image output management apparatus 200. For example, the data storage unit 230 may be implemented by using storage devices, such as a hard disk drive and a semiconductor memory.

The similar-request determining unit 240 compares, with one another, the pieces of request information for requesting image output, and thus determines pieces of request information satisfying a predetermined similarity condition. The presentation candidate selecting unit 250 selects one or more pieces of request information, which are delete candidates, from the pieces of request information satisfying the similarity condition.

The presentation information generating unit 260 generates presentation information, which indicates the pieces of request information satisfying the similarity condition, as prior information presented to a user before execution of image output according to the pieces of request information. The presentation information generating unit 260 may generate presentation information for presenting the one or more pieces of request information, which are selected by the presentation candidate selecting unit 250, as delete candidates.

The image output management apparatus 200 in the concrete example illustrated in FIG. 2 may be implemented, for example, by using one or more computers. Each computer includes hardware resources, for example, a computation device such as a central processing unit (CPU), storage devices, such as a memory and a hard disk, a communication device using a communication line such as the Internet, a device which reads/writes data from/to a storage medium, such as an optical disk, a semiconductor memory, or a card memory, a display device such as a display, and an operation device receiving operations from users.

For example, programs (software) corresponding to at least a subset of the functions of the components which are designated with the reference numerals and which are included in the image output management apparatus 200 illustrated in FIG. 2 are read into a computer. The hardware resources included in the computer cooperate with the read software. Thus, at least a subset of the functions of the image output management apparatus 200 illustrated in FIG. 2 are implemented in the computer. For example, the programs may be provided to the computer (image output management apparatus 200) via a communication line such as the Internet, or may be provided to the computer (image output management apparatus 200) by storing the programs in a storage medium, such as an optical disk, a semiconductor memory, or a card memory.

At least a subset of the functions of the components which are designated with the reference numerals and which are included in the image output management apparatus 200 illustrated in FIG. 2 may be provided for the image output apparatus 400 in FIG. 1. For example, at least a subset of the request information acquiring unit 210, the request information management unit 220, the data storage unit 230, the similar-request determining unit 240, the presentation candidate selecting unit 250, and the presentation information generating unit 260 which are illustrated in FIG. 2 may be included in the image output apparatus 400 in FIG. 1.

The image output management apparatus 200 illustrated in FIG. 2 may be provided with functions of the server apparatus 300 in FIG. 1. For example, the image output management apparatus 200 may manage files that are to be subjected to image output.

The overall configuration of the image output system (including the image output management apparatus 200 illustrated in FIG. 2) illustrated in FIG. 1 is described above. A concrete example of the process implemented by the image output system in FIG. 1 will be described in detail.

For the configuration (components) illustrated in FIGS. 1 and 2, the following description uses the reference numerals in FIGS. 1 and 2.

FIG. 3 is a diagram illustrating a concrete example of request information for requesting image output. FIG. 3 illustrates a concrete example of information included in each of the one or more pieces request information managed by the request information management unit 220 of the image output management apparatus 200.

In the concrete example illustrated in FIG. 3, request information includes basic information, such as the file name, the creation date and time, and the user name. The file name is a concrete example of file information indicating the file name of a file that is to be output. The file having the file name included in request information indicates a target of image output according to the request information.

The creation date and time indicates information about the date and time when the request information was created. For example, the creation date and time included in request information indicates the date and time when image output was requested by using the request information. The user name indicates a concrete example of user information for identifying the user who requested output. The user name included in request information is used to identify the user corresponding to the request information. For example, identification information (such as a user identifier) for identifying a user may be used as the user information.

For example, as illustrated in FIG. 3, request information may include additional information, such as the file registration date and time, the file version, the user group name, the output sheet count, the file size, the file format, the output pattern, and the output count.

The file registration date and time is information indicating the date and time when the file that is to be output was registered in the server apparatus 300. The file version is information indicating the version of the file that is to be output. The user group name indicates a concrete example of group information for identifying the group to which the user who requested output belongs.

The output sheet count indicates an output sheet count of images that were output according to the request information. For example, if request information is information for requesting image output through printing, the count of printed media (such as sheets) is stored as the output sheet count. The file size indicates the size (data size) of the file that is to be output. The file format indicates the data format (such as an extension) of the file that is to be output.

The output pattern indicates an output pattern of an image that is to be output according to the request information. For example, if request information is information for requesting image output though printing, print patterns, such as duplex printing or single-sided printing and landscape printing or portrait printing, are stored as the output pattern. The output count indicates the count of image output operations performed according to the request information.

Request information may be formed only of a subset of pieces of information illustrated in FIG. 3. Alternatively, request information may include information other than the information illustrated in FIG. 3.

Figure 4:
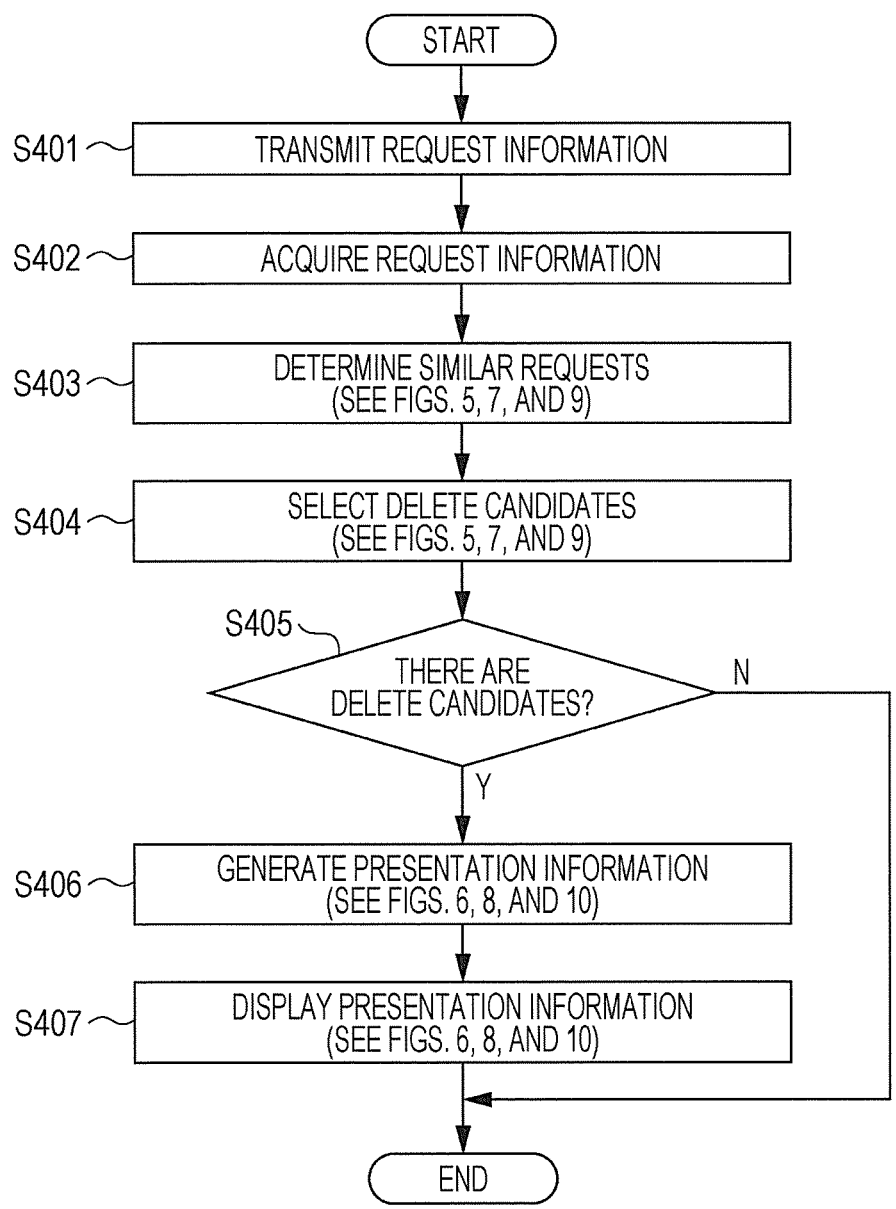
FIG. 4 is a diagram illustrating a concrete example of an image output process performed by the image output system in FIG. 1.

FIG. 4 is a diagram (flowchart) illustrating a concrete example of the image output process performed by the image output system in FIG. 1.

Request information for requesting image output is transmitted (S401). The image output management apparatus 200 acquires the request information (S402). For example, request information from a user who requests image output is transmitted from the user's user apparatus 100, and the request information acquiring unit 210 receives and acquires the transmitted request information. For example, pieces of request information obtained from multiple users are stored in the data storage unit 230 and are managed by the request information management unit 220.

Then, pieces of request information satisfying the predetermined similarity condition are determined (S403). From the pieces of request information, one or more pieces of request information that are delete candidates are selected (S404). For example, the similar-request determining unit 240 compares, with one another, the pieces of request information for requesting image output which are managed by the request information management unit 220, and thus determines pieces of request information satisfying the predetermined similarity condition. The presentation candidate selecting unit 250 selects one or more pieces of request information, which are delete candidates, from the pieces of request information satisfying the similarity condition.

Then, if one or more pieces of request information which are delete candidates have been selected (S405), presentation information that is to be presented to a user is generated (S406). For example, the presentation information generating unit 260 generates presentation information, which indicates the pieces of request information satisfying the similarity condition, as prior information presented to the user before execution of image output according to the pieces of request information. The presentation information generating unit 260 may generate presentation information for presenting the one or more pieces of request information, which are selected by the presentation candidate selecting unit 250, as delete candidates.

The generated presentation information is displayed (S407). For example, the presentation information generated by the presentation information generating unit 260 of the image output management apparatus 200 is transmitted to the image output apparatus 400 used by the user. An image corresponding to the presentation information is displayed on the display device of the image output apparatus 400. Thus, the presentation information is presented to the user.

In contrast, if one or more pieces of request information that are delete candidates have not been selected (S405), presentation information is not generated for display. Even when one or more pieces of request information that are delete candidates have not been selected, if there are pieces of request information satisfying the similarity condition, the presentation information generating unit 260 may generate presentation information indicating the pieces of request information, and an image corresponding to the presentation information may be displayed on the display device of the image output apparatus 400.

FIG. 5 is a diagram illustrating a first concrete example of pieces of request information satisfying the similarity condition. For example, the similar-request determining unit 240 compares the pieces of request information, which are managed by the request information management unit 220, with one another in terms of the user information and the file information which are included in each piece of request information. Thus, the similar-request determining unit 240 determines pieces of request information, which correspond to the same file name and are transmitted from the same user, to be pieces of request information satisfying the similarity condition.

For example, pieces of request information having the same user name and the same file name are regarded as pieces of request information satisfying the similarity condition. FIG. 5 illustrates two pieces of request information, whose user names are "AAA" and whose file names are "abcde", as a concrete example of pieces of request information satisfying the similarity condition.

The presentation candidate selecting unit 250 selects one or more pieces of request information, which are delete candidates, from the pieces of request information satisfying the similarity condition. For example, the presentation candidate selecting unit 250 compares the pieces of request information, which satisfy the similarity condition, with one another in terms of the creation time information included in each piece of request information. Thus, the presentation candidate selecting unit 250 selects one or more pieces of request information, whose creation dates and times are not the latest, as delete candidates.

For example, in the first concrete example illustrated in FIG. 5, the creation time (the creation date and the creation hour and minute) of the request information corresponding to Request No. 1 is Jan. 1, 2018 at 10:00 AM. The creation time of the request information corresponding to Request No. 2 is Jan. 1, 2018 at 10:05 AM. Therefore, in the first concrete example illustrated in FIG. 5, the request information of Request No. 1 is selected as one or more pieces of request information whose creation dates and times are not the latest.

The presentation information generating unit 260 generates presentation information, which indicates the pieces of request information satisfying the similarity condition, as prior information presented to a user before execution of image output according to the pieces of request information satisfying the similarity condition. The presentation information generating unit 260 may generate presentation information for presenting the one or more pieces request information selected, as delete candidates, from the pieces of request information satisfying the similarity condition.

Figure 6:
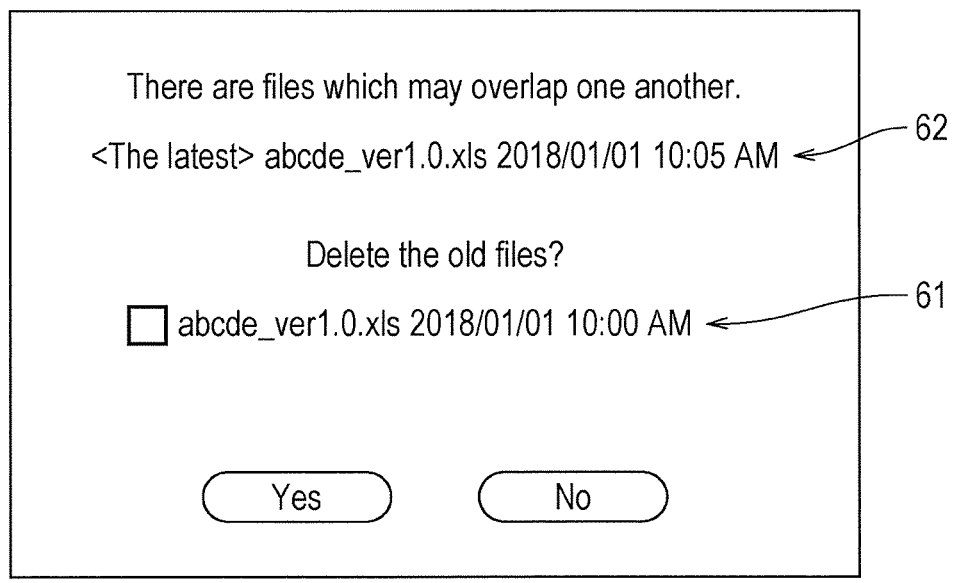
FIG. 6 is a diagram illustrating a first concrete example of presentation information.

FIG. 6 is a diagram illustrating a first concrete example of presentation information. FIG. 6 illustrates a concrete example of presentation information for presenting pieces of request information satisfying the similarity condition and one or more pieces of request information selected as delete candidates.

In the first concrete example illustrated in FIG. 6, two pieces of request information of Request No. 1 and Request No. 2 which are illustrated in FIG. 5 are presented as pieces of request information satisfying the similarity condition. The request information of Request No. 1 illustrated in FIG. 5 is presented as a delete candidate.

That is, in FIG. 6, request information 62 which was created for the file name, "abcde (Version 1.0)", Jan. 1, 2018 at 10:05 AM and which is presented as the latest request information corresponds to Request No. 2 (FIG. 5). Request information 61 which was created for the file name, "abcde (Version 1.0)", Jan. 1, 2018 at 10:00 AM and which is presented as a delete candidate corresponds to Request No. 1 (FIG. 5).

For example, when the user whose user name is "AAA" and who has transmitted the request information uses the image output apparatus 400, the presentation information illustrated in FIG. 6 is displayed on the display device included in the image output apparatus 400 before execution of image output according to the request information 61 and the request information 62.

For example, in the image of the presentation information illustrated in FIG. 6, the user operates and checks the checkbox corresponding to the request information 61 displayed as a delete candidate, and then operates the button on which "Yes" is displayed. Thus, the request information 61 which is a delete candidate is deleted.

After that, the user performs an operation of giving an instruction to perform image output. Thus, the image according to the latest request information 62 is output. For example, if the image output is printing, the image corresponding to the file name, "abcde (Version 1.0)", which is the output target of the request information 62 is printed on a medium such as a sheet, and is output from the image output apparatus 400. If the request information 61 has been deleted, image output according to the request information 61 is not performed. Thus, output of the duplicate images for the same file name, "abcde (Version 1.0)", is avoided.

When the request information 61 has not been deleted, for example, when a button on which "No" is displayed is operated in the image of the presentation information illustrated in FIG. 6, images according to both the request information 61 and the request information 62 may be output.

FIG. 7 is a diagram illustrating a second concrete example of pieces of request information satisfying the similarity condition. For example, pieces of request information having the same user name and the same file name are regarded as pieces of request information satisfying the similarity condition. FIG. 7 illustrates three pieces of request information, having the user name, "AAA", and the file name, "abcde", as a concrete example of pieces of request information satisfying the similarity condition. In addition, for example, the pieces of request information satisfying the similarity condition are compared with one another in terms of creation time information included in each piece of request information. Thus, one or more pieces of request information whose creation dates and times are not the latest are selected as delete candidates.

In the second concrete example illustrated in FIG. 7, the two pieces of request information of Request No. 1 and Request No. 2 correspond to the two pieces of request information of Request No. 1 and Request No. 2, respectively, in the first concrete example in FIG. 5. In the second concrete example illustrated in FIG. 7, Request No. 3 indicates request information having the same user name, "AAA", as Request No. 1 and Request No. 2. The creation time (the creation date and the creation hour and minute) of the request information corresponding to Request No. 3 is Jan. 1, 2018 at 10:10 AM. Therefore, in the second concrete example illustrated in FIG. 7, the pieces of request information of Request No. 1 and Request No. 2 are selected as one or more pieces of request information whose create dates and times are not the latest.

The presentation information generating unit 260 generates presentation information, indicating the pieces of request information satisfying the similarity condition, as prior information presented to the user before execution of image output according to the pieces of request information satisfying the similarity condition. The presentation information generating unit 260 may generate presentation information for presenting the one or more pieces of request information selected, as delete candidates, from the pieces of request information satisfying the similarity condition.

Figure 8:
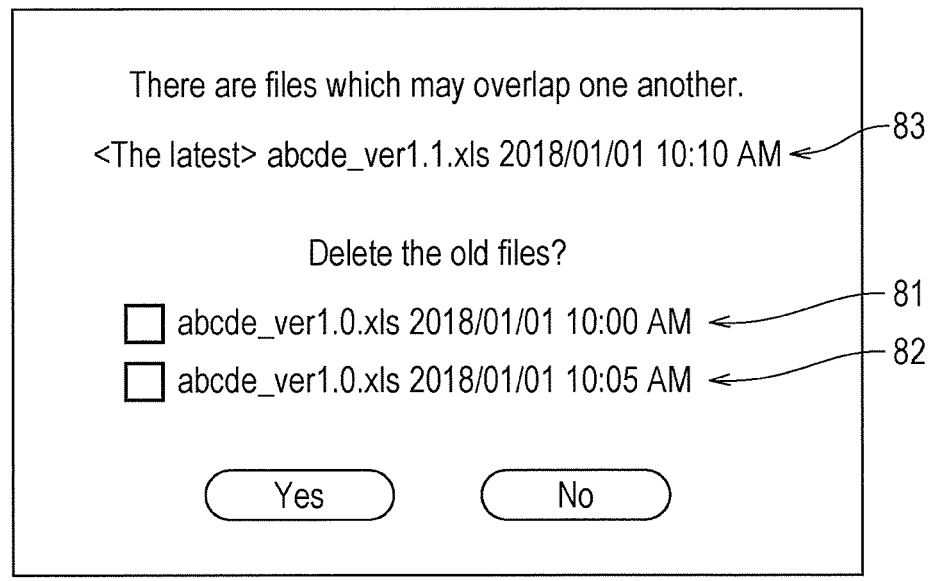
FIG. 8 is a diagram illustrating a second concrete example of presentation information.

FIG. 8 is a diagram illustrating a second concrete example of presentation information. FIG. 8 illustrates a concrete example of presentation information for presenting the pieces of request information satisfying the similarity condition and the one or more pieces of request information selected as delete candidates.

In the second concrete example illustrated in FIG. 8, the three pieces of request information of Request No. 1, Request No. 2, and Request No. 3 illustrated in FIG. 7 are presented as pieces of request information satisfying the similarity condition. The pieces of request information of Request No. 1 and Request No. 2 illustrated in FIG. 7 are presented as delete candidates.

That is, in FIG. 8, request information 83 which was created for a file name, "abcde (Version 1.1)", Jan. 1, 2018 at 10:10 AM and which is presented as the latest request information corresponds to Request No. 3 (FIG. 7). Request information 81 which was created for the file name, "abcde (Version 1.0)", Jan. 1, 2018 at 10:00 AM and which is presented as a delete candidate corresponds to Request No. 1 (FIG. 7). Request information 82 which was created for the file name, "abcde (Version 1.0)", Jan. 1, 2018 at 10:05 AM and which is presented as a delete candidate corresponds to Request No. 2 (FIG. 7).

For example, when a user whose user name is "AAA" and who has transmitted the request information uses the image output apparatus 400, the presentation information illustrated in FIG. 8 is displayed on the display device included in the image output apparatus 400 before execution of image output according to Request No. 1, Request No. 2, and Request No. 3.

For example, the user operates and checks the checkboxes corresponding to the request information 81 and the request information 82, which are displayed as delete candidates, in the image of the presentation information illustrated in FIG. 8, and then operates the button on which "Yes" is displayed. Thus, the request information 81 and the request information 82 which are delete candidates are deleted. Alternatively, only one of the request information 81 and the request information 82 may be deleted.

After that, the user performs an operation of giving an instruction to perform image output. Thus, the image corresponding to the latest request information 83 is output. For example, if the image output is printing, the image corresponding to the file name, "abcde (Version 1.1)", which is the output target of the request information 83 is printed on a medium such as a sheet, and is output from the image output apparatus 400. If the request information 81 and the request information 82 have been deleted, image output according to the request information 81 and the request information 82 is not performed. Thus, wasteful output of the image corresponding to the file name, "abcde (Version 1.0)", before the version update is avoided.

When the request information 81 and the request information 82 have not been deleted, for example, when the button on which "No" is displayed is operated in the image of the presentation information illustrated in FIG. 8, image output according to the request information 83, the request information 81, and the request information 82 may be performed. If only one of the request information 81 and the request information 82 has been deleted, image output according to the remaining request information which has not been deleted may be performed.

FIG. 9 is a diagram illustrating a third concrete example of pieces of request information satisfying the similarity condition. For example, the similar-request determining unit 240 may compare the pieces of request information, which are managed by the request information management unit 220, with one another in terms of the group information and the file information included in each piece of request information. Thus, pieces of request information which correspond to the same file name and which have been transmitted by users belonging to the same group may be regarded as pieces of request information satisfying the similarity condition.

For example, pieces of request information having the same group name and the same file name are regarded as pieces of request information satisfying the similarity condition. FIG. 9 illustrates four pieces of request information whose group names are "General affairs department" and whose file names are "abcde", as a concrete example of pieces of request information satisfying the similarity condition.

In the third concrete example illustrated in FIG. 9, the three pieces of request information of Request No. 1 to Request No. 3 correspond to the three pieces of request information of Request No. 1 to Request No. 3, respectively, in the second concrete example in FIG. 7. Request No. 1 to Request No. 3 indicate pieces of request information whose user names are "AAA". In the third concrete example illustrated in FIG. 9, image output according to Request No. 3 has been already performed. Therefore, the output time of the image which is included in the request information of Request No. 3 is recorded as 10:20 AM.

In the third concrete example illustrated in FIG. 9, Request No. 4 indicates the request information from a user whose user name is "BBB" and who belongs to the same department, the general affairs department, as the user whose user name is "AAA". The creation time (the creation date and the creation hour and minute) of the request information corresponding to Request No. 4 is Jan. 1, 2018 at 3:10 PM.

In the third concrete example illustrated in FIG. 9, the creation date and time of the request information of Request No. 4 is the latest among Request No. 1 to Request No. 4. Request No. 4 indicates request information which is transmitted from the user having the user name, "BBB", and whose output target is the file having the file name, "abcde (Version 1.0)". In contrast, Request No. 3 whose creation date and time is older (not the latest) than that of Request No. 4 indicates request information which is transmitted from the user having the user name, "AAA", and whose output target is the file that has the file name, "abcde (Version 1.1)", and that has been already output.

That is, in the third concrete example illustrated in FIG. 9, although the user whose user name is "AAA" and who belongs to the same department, the general affairs department, has updated the file, having the file name, "abcde", to Version 1.1, the user whose user name is "BBB" and who belongs to the same department, the general affairs department, may not know the update and may be going to output the old file of Version 1.0 having the file name, "abcde".

Therefore, the presentation candidate selecting unit 250 compares the pieces of request information, which satisfy the similarity condition, with one another in terms of the version information included in each piece of request information, and thus specifies the latest version. The presentation information generating unit 260 generates presentation information indicating that there is a file of the latest version, as prior information presented to a user before execution of image output according to the pieces of request information satisfying the similarity condition.

Figure 10:
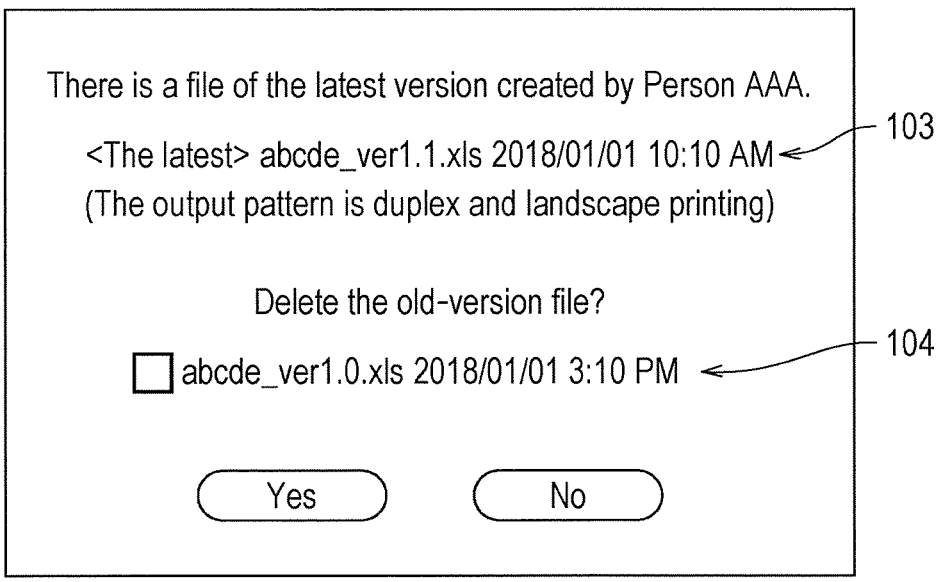
FIG. 10 is a diagram illustrating a third concrete example of presentation information.

FIG. 10 is a diagram illustrating a third concrete example of presentation information. FIG. 10 illustrates a concrete example of presentation information indicating that there is a file of the latest version.

In the third concrete example illustrated in FIG. 10, request information 103 which was created for the file name, "abcde (Version 1.1)", Jan. 1, 2018 at 10:10 AM and which is presented as request information corresponding to the file of the latest version corresponds to Request No. 3 (FIG. 9). Request information 104 which was created for the file name, "abcde (Version 1.0)", Jan. 1, 2018 at 3:10 PM and which is presented as request information that corresponds to the old-version file and that is presented as a delete candidate corresponds to Request No. 4 (FIG. 9).

For example, when the user whose user name is "BBB" and who has transmitted the request information uses the image output apparatus 400, the presentation information illustrated in FIG. 10 is displayed on the display device included in the image output apparatus 400 before execution of image output according to the request information 103 and the request information 104.

For example, the user operates and checks the checkbox, which corresponds to the request information 104 displayed as a delete candidate, in the image of the presentation information illustrated in FIG. 10, and then operates the button on which "Yes" is displayed. Thus, the request information 104 which is a delete candidate is deleted.

After that, the user performs an operation of giving an instruction to perform image output. Thus, image output according to the request information 103 corresponding to the file of the latest version is performed. For example, if the image output is printing, the image corresponding to the file name, "abcde (Version 1.1)", of the latest version which is the output target of the request information 103 is printed on a medium such as a sheet, and is output from the image output apparatus 400. If the request information 104 has been deleted, image output according to the request information 104 is not performed. Thus, wasteful output of the image corresponding to the file name, "abcde (Version 1.0)", before the version update is avoided.

For example, when request information which has been already executed is to be presented, presentation information indicating the output pattern for the request information may be generated. For example, as in the third concrete example illustrated in FIG. 10, presentation information indicating that the output pattern for the request information 103 corresponding to the file of the latest version is image output (for example, printing) of duplex and landscape printing may be generated. When there are pieces of request information which have been already executed, only the output pattern of the request information which has been executed the last time may be presented.

For example, when one or more pieces of request information which are delete candidates are to be selected from pieces of request information satisfying the similarity condition, one or more pieces of request information whose file registration dates and times (FIG. 3) are not the latest may be selected.

For example, when there is request information, which has been already executed, among pieces of request information satisfying the similarity condition, the output sheet count (FIG. 3) included in the request information may be referred to, and it may be checked whether all of the pages or only a subset of the pages has been output. Then, presentation information for presenting the check result may be generated.

For example, the file size (FIG. 3) may be referred to when the file name is used to determine pieces of request information satisfying the similarity condition. When the file sizes are different by a large amount for the same file name (for example, the difference is equal to or larger than a predetermined reference size), it may be determined that they are different files, and pieces of request information satisfying the similarity condition may be determined.

For example, when the file formats (FIG. 3) are different for the same file name, presentation information presenting the output pattern, the output count, and the like (FIG. 3) as reference information may be generated.

As described above, the suitable exemplary embodiment of the present disclosure is described. The exemplary embodiment described above is merely exemplary in all respects, and does not limit the scope of the present disclosure. The present disclosure encompasses various modified exemplary embodiments which are made without departing from the gist of the present disclosure.

What is claimed is:

1. An image output management apparatus comprising:
   a hardware processor configured to:
   receive a plurality of print jobs comprising a plurality of document data, wherein the plurality of print jobs comprises a first print job including a first document data and a second print job including a second document data from an apparatus used by a user, wherein each of the plurality of document data includes user information and file information, the user information being information for identifying a user who requests output, the file information indicating a file name of a file that is to be output;
   determine whether the first document data and the second document data, which have not been printed, satisfy a similarity condition by comparing with one another, the plurality of document data in terms of the user information and the file information included in each of the plurality of document data, and thus regards the first document data and the second document data that are transmitted from an identical user and that correspond to an identical file name, as the similar documents satisfying the similarity condition;
   generate presentation information indicating similar documents comprising the first document data and the second document data satisfying the similarity condition with the first document data being automatically presented a deletion candidate prior to printing as the first document has an older creation date than the second document, and
   present the presentation information to the user before printing any of the first print job and the second print job.

2. The image output management apparatus according to claim 1,
   wherein each of the plurality of document data further includes group information and file information, the group information being information for identifying a group to which a user who requests output belongs, the file information indicating a file name of a file that is to be output, and
   wherein the processor is further configured to compare, with one another, the plurality of document data in terms of the group information and the file information included in each of the plurality of document data, and thus regards first document data and the second document data that are transmitted from users belonging to an identical group and that correspond to an identical file name, as the similar documents satisfying the similarity condition.

3. The image output management apparatus according to claim 2,
   wherein each of the plurality of document data includes creation time information indicating a date and time when each of the plurality of document data was created, and
   wherein the processor is further configured to compare, with one another, the plurality of document data satisfying the similarity condition, in terms of the creation time information included in each of the plurality of document data, and thus selects, as delete candidates, one or more the document data whose creation dates and times are not latest.

4. The image output management apparatus according to claim 1,
wherein each of the plurality of document data includes group information and the file information, the group information being information for identifying a group to which the user who requests output belongs, the file information indicating a file name of a file that is to be output, and
wherein the processor is further configured to compare, with one another, the plurality of document data in terms of the group information and the file information included in each of the plurality of document data, and thus regards the first document data and the second document data that are transmitted from users belonging to an identical group and that correspond to an identical file name, as the similar documents satisfying the similarity condition.

5. The image output management apparatus according to claim 4,
wherein each of the plurality of document data includes creation time information indicating a date and time when each of the plurality of document data was created, and
the processor is further configured to compare, with one another, the plurality of the document data satisfying the similarity condition, in terms of the creation time information included in each of the plurality of the document data, and thus selects, as delete candidates, one or more of the plurality of document data whose creation dates and times are not latest.

6. The image output management apparatus according to claim 1,
wherein each of the plurality of document data includes creation time information indicating a date and time when each of the plurality of document data was created, and
the processor is further configured to compare, with one another, the plurality of document data satisfying the similarity condition, in terms of the creation time information included in each of the plurality of document data, and thus selects, as delete candidates, one or more of the document data whose creation dates and times are not latest.

7. The image output management apparatus according to claim 1,
wherein each of the plurality of document data includes version information indicating a version of a file that is to be output, and
wherein a latest version is specified by comparing, with one another, the plurality of document data satisfying the similarity condition, in terms of the version information included in each of the plurality of document data, and presentation information indicating that there is a file of the latest version is generated as a prior information.

8. The image output management apparatus of claim 1, wherein the plurality of print jobs further includes a third document data, and generate presentation information indicating similar documents comprising:
generate presentation information indicating similar documents comprising the first document data and the second document data and the third document data satisfying the similarity condition with the first document data and the second document data both automatically presented as deletion candidates prior to printing as the first document data and the second document data having older creation dates than the third document data.

9. The image output management apparatus of claim 8, wherein in response to present the presentation information to the user before printing any of the first print job and the second print job, the processor is further configured to:
receive an input to simultaneously delete the first document data and the second document data before printing the third print job.

10. The image output management apparatus of claim 1, wherein the plurality of print jobs further includes a third document data, and generate presentation information indicating similar documents comprising:
generate presentation information indicating similar documents comprising the first document data and the second document data and the third document data satisfying the similarity condition with the third document data being presented as a deletion candidate prior to printing as the third document data has a different user name from the first document data and the second document data.

11. The image output management apparatus of claim 10, wherein in response to present the presentation information to the user before printing any of the first print job and the second print job, the processor is further configured to:
receive an input to delete the third document data before printing the first print job and the second print job.

12. An image output apparatus comprising:
a hardware processor configured to:
receive a plurality of print jobs comprising a plurality of document data, wherein the plurality of print jobs comprising a first print job including a first document data and a second print job including a second document data from an apparatus used by a user, wherein each of the plurality of document data includes user information and file information, the user information being information for identifying a user who requests output, the file information indicating a file name of a file that is to be output;
determine whether the plurality of document data comprising the first document data and the second document data, which have not been printed, satisfy a similarity condition by comparing with one another, the plurality of document data in terms of the user information and the file information included in each of the plurality of document data, and thus regards the first document data and the second document data that are transmitted from an identical user and that correspond to an identical file name, as the similar documents satisfying the similarity condition;
generate presentation information indicating similar documents comprising the first document data and the second document data satisfying the similarity condition with the first document data being automatically presented a deletion candidate prior to printing as the first document has an older creation date than the second document, and present the presentation information to the user before printing the first print job and the second print job.

13. A non-transitory computer readable medium storing a program causing a computer to execute functions comprising:
receiving a plurality of print jobs comprising a plurality of document data, wherein the plurality of print jobs comprising a first print job including a first document data and a second print job including a second document data from an apparatus used by a user, wherein each of the plurality of document data includes user information and file information, the user information being information for identifying a user who requests output, the file information indicating a file name of a file that is to be output;

determining whether the plurality of document data comprising the first document data and the second document data, which have not been printed, satisfy a similarity condition by comparing with one another, the plurality of document data in terms of the user information and the file information included in each of the plurality of document data, and thus regards the first document data and the second document data that are transmitted from an identical user and that correspond to an identical file name, as the similar documents satisfying the similarity condition; and generating presentation information indicating similar documents comprising the first document data and the second document data satisfying the similarity condition with the first document data being automatically presented a deletion candidate prior to printing as the first document has an older creation date than the second document, and present the presentation information to the user before printing the first print job and the second print job.

\* \* \* \* \*